(12) United States Patent
Sturm

(10) Patent No.: US 7,459,196 B2
(45) Date of Patent: Dec. 2, 2008

(54) SHIELDING DEVICE

(75) Inventor: Rainer Sturm, Altdorf (DE)

(73) Assignee: ElringKlinger AG, Dettingen/Erms (DE)

( * ) Notice: Subject to any disclaimer, the term of this patent is extended or adjusted under 35 U.S.C. 154(b) by 139 days.

(21) Appl. No.: 11/433,771

(22) Filed: May 15, 2006

(65) Prior Publication Data

US 2007/0254135 A1 Nov. 1, 2007

(30) Foreign Application Priority Data

Apr. 28, 2006 (DE) .................. 10 2006 019 928

(51) Int. Cl.
*B32B 3/06* (2006.01)
(52) U.S. Cl. .................. 428/99; 428/122; 428/131; 24/535
(58) Field of Classification Search .......... 428/99, 428/122, 131; 24/535, 569; 60/322
See application file for complete search history.

(56) References Cited

U.S. PATENT DOCUMENTS

| 5,233,953 | A | | 8/1993 | Whitehurst et al. |
| 5,355,646 | A | * | 10/1994 | Bischel et al. ............. 52/489.1 |
| 6,382,404 | B1 | * | 5/2002 | Guldenfels .................. 198/850 |
| 6,438,949 | B1 | * | 8/2002 | Nozaki ......................... 60/322 |
| 6,530,443 | B1 | | 3/2003 | Tsuruta et al. |

FOREIGN PATENT DOCUMENTS

DE 195 08 872 9/1996

* cited by examiner

Primary Examiner—Alexander Thomas
(74) Attorney, Agent, or Firm—Roylance, Abrams, Berdo & Goodman, L.L.P.

(57) ABSTRACT

A shielding device with a shielding component (17) forming a shield surface, a heat shield in particular, has a clamping component (1) formed to be integral with the shielding component (17) by an extension. The clamping component is folded onto itself at a bending point (29). Two clamping legs (31, 33) are positioned side by side and form the clamping surfaces facing each other to delimit a clamping gap (35) with one end closed at the bending point (29).

19 Claims, 4 Drawing Sheets

SHIELDING DEVICE

FIELD OF THE INVENTION

The present invention relates to a shielding device having a shielding component forming a shielding surface, a heat shield in particular, and a clamping component.

BACKGROUND OF THE INVENTION

Shielding components which may be fastened on a mounting component serving as support have been disclosed. Such shielding devices are widely used in automotive engineering to protect heat-sensitive structural components such as sensors, fuel lines, pressure cells, critical bolted joints on sensitive housing components, etc. While the heat generated, for example, by an economical performance-optimized diesel engine on the cylinder or crankcase housing may be very slight, this situation is not at all true of "hot zones" such as those of manifolds, turbochargers, catalytic converters, etc. Protective shielding surfaces must then be present at appropriate points. This need applies in particular in the vicinity of catalytic converters, which represent strong heat sources because of their phases of high surface temperature.

During operation the shielding devices required in the "hot zones" are subjected not only to thermal loads but to mechanical loads as well, especially as a result of vibrations transmitted to the shielding component by support components. Because of these stresses, special requirements are set for the connecting devices which hold such shielding devices in place on the associated mounting components. The conventional state-of-the-art connecting devices provide springs (clips) clamped under a certain amount of preliminary tension to stay bolts or the like, and to entire structural components such as ignition switches of generators or exhaust manifolds. The clamping force or retaining force is determined by selection of the spring material and the structural configuration of the respective springs. It has been found that, in particular if the support component involved is a high-temperature component, the danger exists that fatigue phenomena may occur in the material of the spring, and is increased if vibrations resulting from operation are added. Consequently, connecting devices of the prior art do not ensure reliable fastening of the respective shielding components.

SUMMARY OF THE INVENTION

An object of the present invention is to provide by a simple and reliable method a shielding device ensuring especially secure fastening of the shielding component, even when subjected to high continuous thermal and mechanical loads.

This object is basically attained according to the present invention by a shielding device having a clamping component forming the connecting device for fastening the shielding component to a support component, being an extension of the shielding component, and being integral with this shielding component. This extension is such that, if it is folded back on itself, two clamping legs are formed providing clamping surfaces facing each other to form therebetween a clamping gap having a closed end at the bending point. The clamping component thus forms an integral part of the shielding component. A connecting device of especially high structural strength is then formed. Reliable mounting of the shielding device is accordingly ensured, even in the presence of high thermal and mechanical loads.

Preferably, the dimensions of the clamping component are such that the length of the clamping leg, measured from the bending point to its free end spaced a distance from this bending point, corresponds approximately to the primary extent of the shielding component measured in this direction. Clamping surfaces of large dimensions are accordingly made available for operation in conjunction with mounting components of correspondingly great dimensions.

In especially advantageous exemplary embodiments, a tensioning device is associated with the clamp legs by which the clamping surfaces may be pressed against a mounting component present in the clamping gap. As a result, a high clamping force is maintained over long periods of operation. The risk is avoided of weakening of the force of application as a result of material fatigue, such as results from decrease of the force of the springs in conventional clips.

By special preference, the tensioning device can be a bolt nut on the outside of a clamping leg aligned with it screw holes for a clamp bolt in the clamping legs. This arrangement makes it possible to achieve high clamping force with a simple and compact design.

In advantageous exemplary embodiments, the shield surface has a primary surface component and a secondary surface component bent at an angle or arched relative to each other. The extension forming the clamping leg is adjacent to the secondary surface component. In this configuration, in addition to a main shielding zone, between it and the clamping component, another shielding zone, in keeping with the circumstances, may follow a pattern different from that of the primary shielding zone and may require positioning of the clamping component as desired at a certain distance from the shielding component.

For this purpose the configuration may be such that the primary surface component is on the whole rectangular in outline and adjoins the secondary surface component on a long side of the primary surface component.

The width of the secondary surface component may form an extension of the shorter side edges of the primary surface component. Alternatively, the width of the secondary surface component, measured in the direction of the clamping leg, may be less than the length of the clamping legs. In this alternative instance, the clamping legs extend beyond the side edges of the secondary surface component on both sides. In this configuration, the thermal shielding effect of the primary surface component may be large enough so that it is sufficiently great in area, while the secondary surface component may be narrower in shape but meets the mechanical requirements set for adequate structural strength.

Especially high structural strength is obtained for the shielding device as a whole if at least one reinforcing seam is formed. Such seam extends over the shielding component and the clamping component in their entirety.

It is especially advantageous for the configuration to have two reinforcing seams positioned symmetrically with the shielding surface of the shielding component. The seams extend perpendicularly to the longitudinal direction of the clamping leg and in parallel with each other to the remote end of the clamping element.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 2:
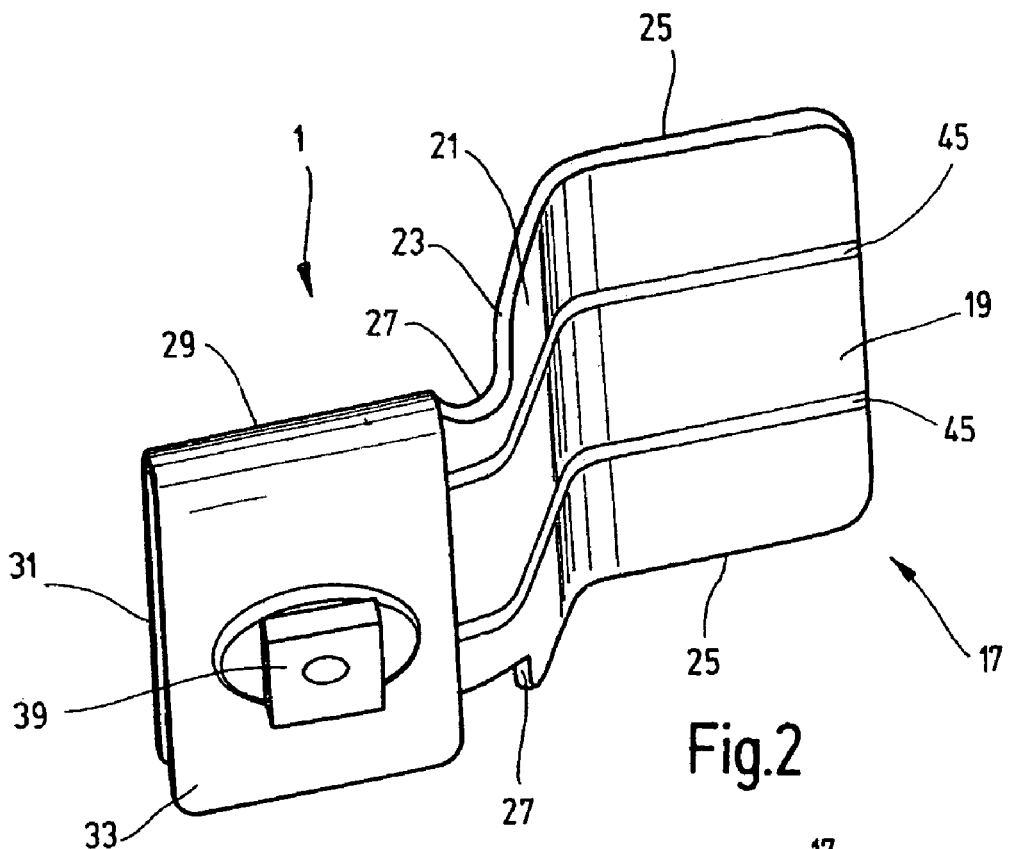
FIG. 2 is a diagrammatic, not to scale perspective view of the embodiment of FIG. 1, viewed from the bottom with the tensioning device.
Figure 1:
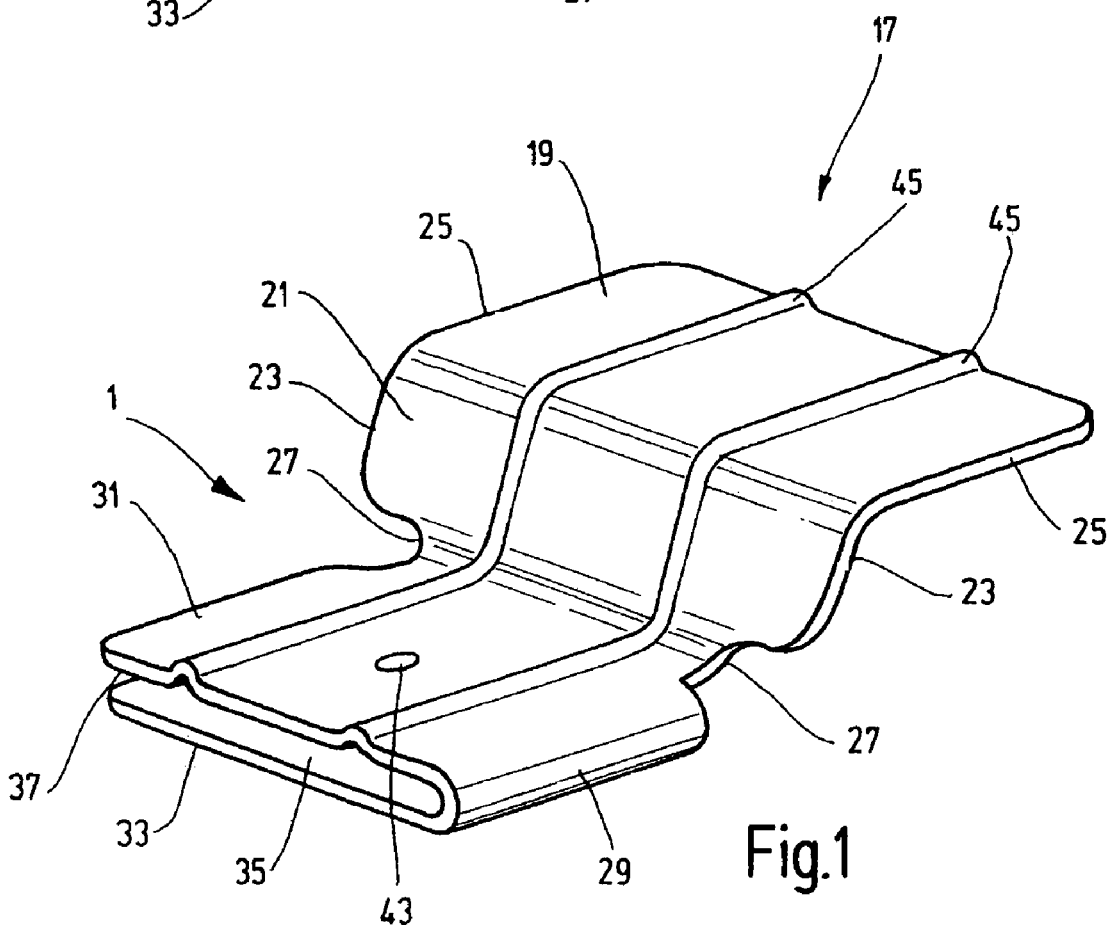
FIG. 1 is a diagrammatic, not to scale perspective view of the top of a shielding device according to a first embodiment of the present invention, with components of the associated tensioning device being omitted.
Figure 3:
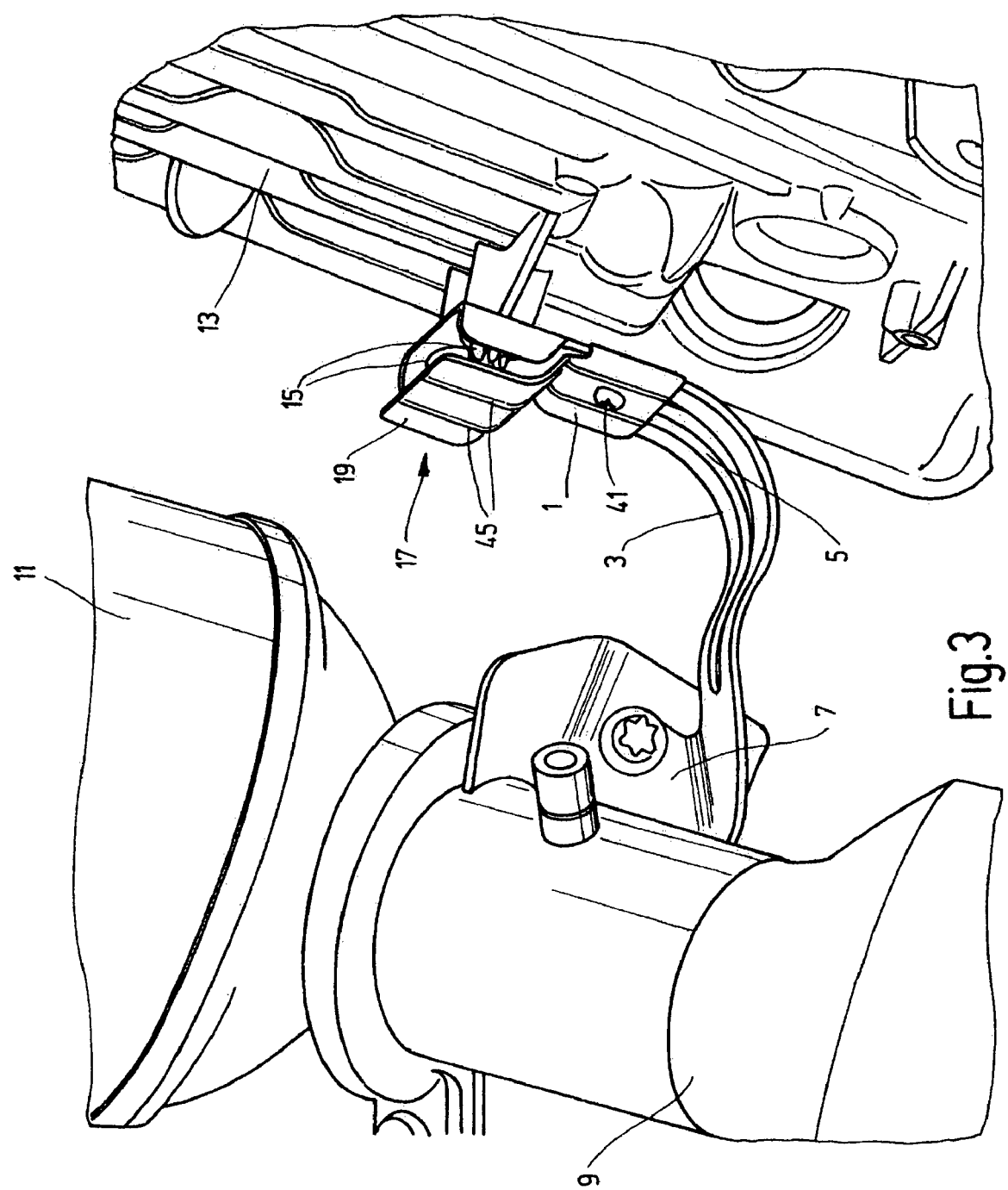
FIG. 3 is a detached perspective view, on a smaller scale than in FIGS. 1 and 2, of the embodiment of FIGS. 1 and 2 shown installed, that is, fastened on a support component.

FIG. 3 shows the first exemplary embodiment of the present invention illustrated in FIGS. 1 and 2 as installed. The shielding device with its clamping component 1 is fastened on a mounting component 3 serving as support. The mounting component is in the form of a sheet metal component with a curved end section, in the center of which is a longitudinal slot 5. The other mounting component end has no slot 3, and forms a fastening plate 7 fastened by screws to an exhaust manifold 9 of an internal combustion engine. The exhaust manifold 9 and catalytic converter 11 form a "hot zone" so that it is necessary to provide thermal shielding for heat-sensitive zones of an adjacent housing component 13. In the example illustrated in FIG. 3, the housing component 13 has heat-sensitive screws 15 shielded by the shielding component 17 forming a shielding surface and serving as a heat shield.

FIGS. 1 and 2 illustrate the shielding device in detail. The device is a one-piece structural or plate component. Clamping component 1 and shielding component 17 are formed from a single sheet of metal, such as stainless steel so as to be integral. The plate component has been cut and molded in such a way that the shielding component 17 forms a primary shield surface component 19 and an adjoining secondary shield surface component 21 bent to form an obtuse angle therebetween. The clamping component 1 in turn adjoins the secondary shield surface component. As shown in FIGS. 1 and 3 in particular, the primary shield surface component 19 is more or less rectangular in outline (aside from the rounded edge areas). The secondary surface component 21 adjoins a longer side of the primary surface component 19. As distinctly shown in FIG. 1 in particular, the side edges 23 of the secondary surface component 21 form a direct extension of the shorter side edges 25 of the primary surface component 19. Clamping component 1, in turn, forms an integral extension of the shielding component 17, and adjoins the end of the secondary surface component 21 remote from the primary surface component 19. The width of the transitional area is reduced by constrictions 27 in the transitional area between secondary surface component 21 and clamping component 1.

The clamping component 1 adjoining the constrictions 27 extends in a plane essentially in parallel with the plane of the primary surface component 19. The sheet-metal batch forming the clamping component 1 is cut to form blanks in such a way that the blanks are bent at an angle at a bending point 29. Bending point 29 extends essentially parallel to the adjacent side edge 25 of the primary surface component 19, and may be folded over so that the clamping component 1 forms two adjacent clamping legs 31 and 33. The clamping surfaces of the clamping legs face each other and define a clamping gap 35 closed at the bending point 29 and open at the opposite end 37. A support component, such as the mounting component 3 shown in FIG. 3, may then be introduced into the clamping gap 35 from the open or free end 37.

As also clearly shown in FIGS. 1 and 2, the length of the clamping gap 35, measured from the bending point 29 to the open or free end 37, corresponds essentially to the length of the shielding component 17 measured in the same direction, and accordingly both to the length of its primary surface component 19 and to that of its secondary surface component 21. The width of the clamping component 1 is measured transversely to the dimension of the primary surface component 19 measured more or less in this direction, that is, essentially parallel to the length of its side edges 25. Clamping surfaces of correspondingly great dimensions for positioning on the mounting component 3 are accordingly obtained for the clamping gap 35. As FIG. 2 shows, a nut 39 is on the exterior of the clamping leg 33 to be used in conjunction with screw holes 43 (FIG. 1) in the clamping legs 31 and 33 and with a tensioning bolt 41 (FIG. 3) to form a tensioning device for bracing the clamping component 1 on the mounting component 3. In the example illustrated in FIGS. 1 to 3, a longitudinal slot 5 is in the mounting component 3, and the tensioning device is mounted so as to be essentially in the center of the clamping component 1.

The sheet-metal component is provided with reinforcing seams 45 to increase the structural strength of the shielding device. These seams extend, spaced a certain distance from each other, perpendicularly to direction of the length of the clamping gap 35 and in parallel with each other both over the shielding component 17 and over the adjoining clamping leg 31 of the clamping component 1 to the clear or free end edge of the latter. As shown in FIG. 1 in particular, the reinforcing seams 45 extend in symmetrical configuration in relation to the primary surface component 19 and secondary surface component 21 and on both sides of the screw holes 43 of the clamping component 1.

Figure 4:
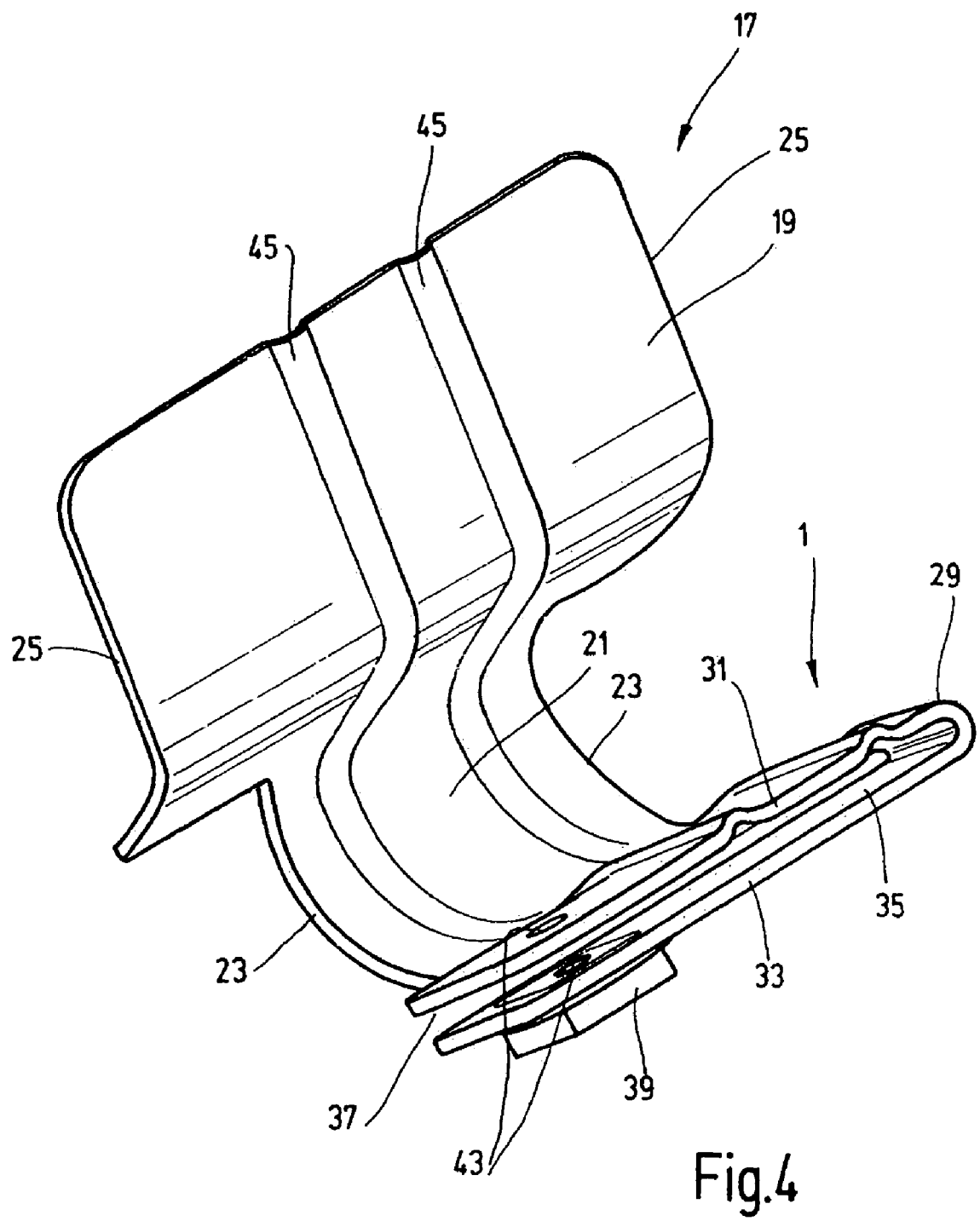
FIG. 4 is a perspective view, similar to that of FIG. 1, of a shielding device according to a second exemplary embodiment of the present invention.
Figure 5:
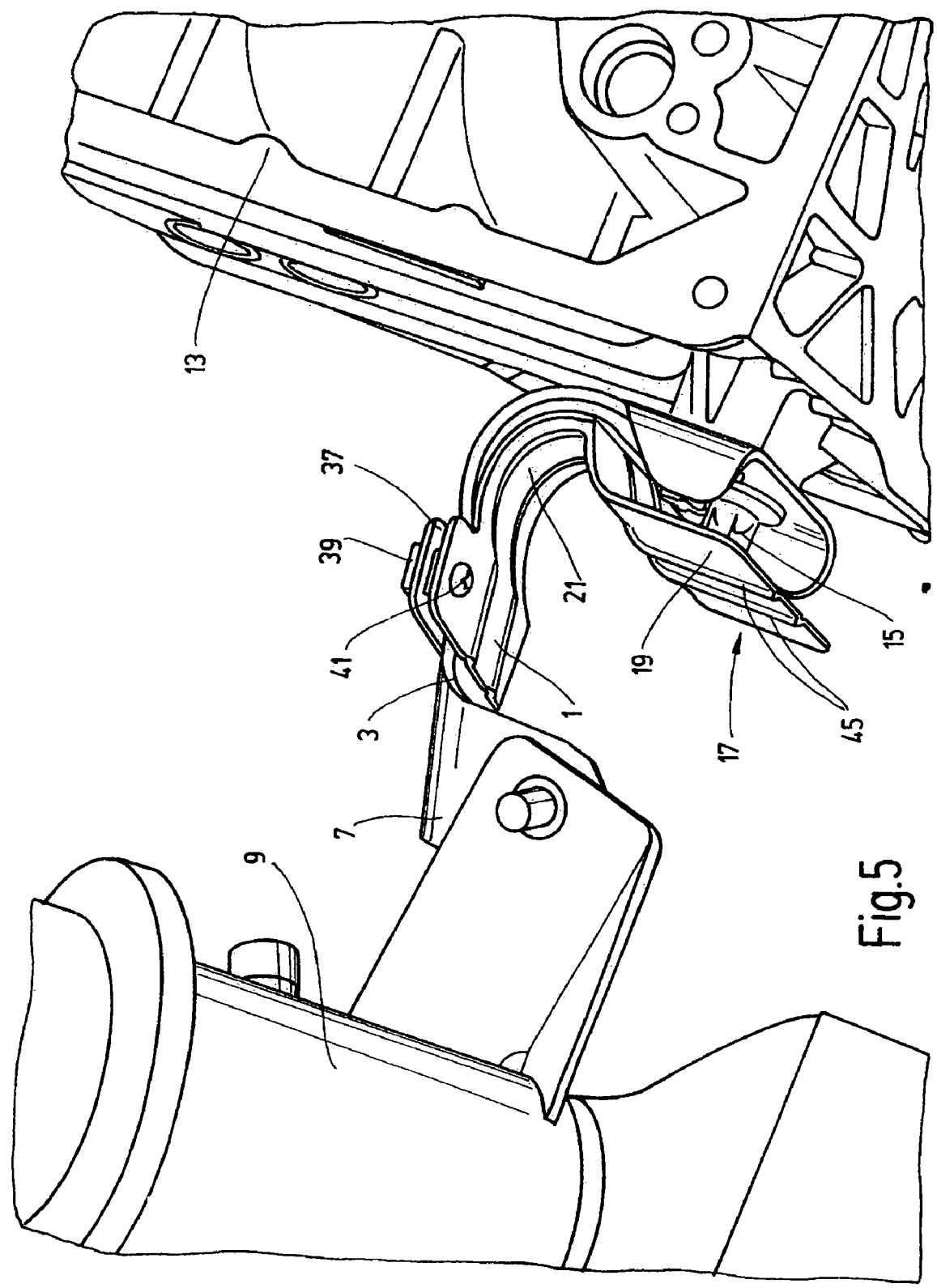
FIG. 5 is a perspective view similar to that of FIG. 3, showing the exemplary embodiment of FIG. 4 in the installed state.

The second exemplary embodiment shown in FIGS. 4 and 5 differs essentially in two respects from the example first described. The first difference relates to the position of the tensioning device made up of nut 39, tensioning bolt 41 (FIG. 5), and screw holes 43. Unlike FIGS. 1 to 3, the tensioning device is not positioned in the central area of the clamping component 1, but is positioned very near the open or free end 37 of the clamping gap 35. This positioning of the tensioning device is provided for fastening the shielding device on a mounting component having no longitudinal slot or having another suitable opening for passage of tensioning bolt 41. In other respects the clamping component 1 corresponds in its configuration to the clamping component described in the foregoing.

The shielding component 17 of the example illustrated in FIGS. 4 and 5, just as is the case with the first embodiment, is divided into a primary surface component 19 and a secondary surface component 21. The second essential difference of the second embodiment is that the secondary surface component 21 is of a width, as measured in the direction of the clamping gap 35, that is significantly smaller than that of the clamping component 1 or the primary surface component 19 measured in the same direction. In addition, the secondary surface component 21 is in the form of a structural component which is arched, relatively long, and curved in comparison to the primary surface component 19. The shape and dimensions selected for the secondary surface component are such that, in addition to the primary shielding zone in the form of the primary surface component 19, a second shielding zone is formed which is of the length and extent desired and/or extends over an optionally greater distance between the shielding component 17 and mounting component 3. In other respects, the configuration of the clamping component 1 and primary surface component 19 of the shielding component 17, including the positioning of reinforcing seams 45, in the second exemplary embodiment corresponds to the first embodiment.

While various embodiments have been chosen to illustrate the invention, it will be understood by those skilled in the art that various changes and modifications can be made therein without departing from the scope of the invention as defined in the appended claims.

What is claimed is:

1. A shielding device, comprising:
   a heat shield having a primary surface component and a secondary surface component bent at an angle relative to said primary surface component and formed unitarily and as one piece therewith, said secondary surface component having side edges extending approximately in parallel;
   a clamping component formed as a unitary, one-piece extension of said secondary surface component and having first and second clamping legs connected by a bending point, said clamping legs being positioned side-by-side and having first and second clamping surfaces, respectively, facing one another and delimiting a clamping gap therebetween, one end of said clamping gap being closed by said bending point extending approximately perpendicularly relative to said side edges of said secondary surface component; and
   a tensioning device coupled to said clamping legs for pressing said clamping surfaces against a mounting component positioned in said clamping gap.

2. A shielding device according to claim 1 wherein said clamping legs have a length extending from said bending point to free ends thereof spaced from said bending point by a leg distance, said primary surface component having a main extent in measured in a parallel direction approximately equal to said leg distance.

3. A shielding device according to claim 1 wherein said tensioning device comprises at least one nut on said first clamping leg, aligned screw holes in said clamping legs, and a tension bolt extending through said screw holes and engaging said nut.

4. A shielding device according to claim 3 wherein said nut and screw holes are positioned approximately halfway between said bending point and free ends of said clamping legs.

5. A shielding device according to claim 3 wherein said nut and said screw holes are positioned adjacent free ends of said clamping legs.

6. A shielding device according to claim 1 wherein said primary surface component is substantially rectangular in outline; and
   said secondary surface component adjoins a long side of said primary surface component.

7. A shielding device according to claim 6 wherein said clamping legs have width in a direction perpendicular to a length of said clamping legs from said bending point to free ends thereof, said width of said clamping legs being at least one-half of a shorter side of said primary surface component.

8. A shielding device according to claim 1 wherein said secondary surface component is arched.

9. A shielding device according to claim 1 wherein at least one reinforcing seam extends over said heat shield and said clamping component.

10. A shielding device according to claim 1 wherein two reinforcing seams symmetrically extend over said heat shield and said clamping component in parallel to one another and perpendicular to a longitudinal direction of said clamping legs from said bending point to free ends thereof.

11. A shielding device, comprising:
    a heat shield having a primary surface component and a secondary surface component bent at an angle relative to said primary surface component and formed unitarily and as one piece therewith, said secondary surface component having side edges extending approximately in parallel; and
    a clamping component formed as a unitary, one-piece extension of said secondary surface component and having first and second clamping legs connected by a bending point, said clamping legs being positioned side-by-side and having first and second clamping surfaces, respectively, facing one another and delimiting a clamping gap therebetween, one end of said clamping gap being closed by said bending point extending approximately perpendicularly relative to said side edges of said secondary surface component, said secondary surface component having a width measured in a direction parallel to and smaller than lengths of said clamping legs extending in a direction from said bending point to free ends thereof, said clamping legs extending beyond both side edges of said secondary surface component.

12. A shielding device according to claim 11 wherein a tensioning device is coupled to said clamping legs for pressing said clamping surfaces against a mounting component positioned in said clamping gap.

13. A shielding device, comprising:
    a heat shield having a primary surface component and a secondary surface component bent at an angle relative to said primary surface component and formed unitarily and as one piece therewith, said primary and secondary surface components extending along longitudinal axes thereof and being directly connected at adjacent longitudinal ends thereof; and
    a clamping component formed as a unitary, one-piece extension of an end of and bent at an angle to said secondary surface component remote from said primary surface component and having first and second clamping legs connected by a bending point, said clamping legs being positioned side-by-side and having first and second clamping surfaces, respectively, facing one another and delimiting a clamping gap therebetween, one end of said clamping gap being closed by said bending point, said clamping gap extending perpendicularly relative to said longitudinal axes of said primary and secondary surface components; and
    a tensioning device coupled to said clamping legs for pressing said clamping surfaces against a mounting component positioned in said clamping gap.

14. A shielding device according to claim 13 wherein said clamping legs have a length extending from said bending point to free ends thereof spaced from said bending point by a leg distance, said primary surface component having a main extent in measured in a parallel direction approximately equal to said leg distance.

15. A shielding device according to claim 13 wherein
at least one reinforcing seam extends over said heat shield and said clamping component.

16. A shielding device according to claim 13 wherein
two reinforcing seams symmetrically extend over said heat shield and said clamping component in parallel to one another and perpendicular to a longitudinal direction of said clamping legs from said bending point to free ends thereof.

17. A shielding device, comprising:
a heat shield having a primary surface component and a secondary surface component bent at an angle relative to said primary surface component and formed unitarily and as one piece therewith, said primary and secondary surface components extending along longitudinal axes thereof and being directly connected at adjacent longitudinal ends thereof; and
a clamping component formed as a unitary, one-piece extension of an end of and bent at an angle to said secondary surface component remote from said primary surface component and having first and second clamping lees connected by a bending point, said clamping legs being positioned side-by-side and having first and second clamping surfaces, respectively, facing one another and delimiting a clamping gap therebetween, one end of said clamping gap being closed by said bending point, said clamping gap extending perpendicularly relative to said longitudinal axes of said primary and secondary surface components, said secondary surface component having a width measured in a direction parallel to and smaller than lengths of said clamping legs extending in a direction from said bending point to free ends thereof, said clamping legs extending beyond both side edges of said secondary surface component.

18. A shielding device according to claim 17 wherein
a tensioning device is coupled to said clamping legs for pressing said clamping surfaces against a mounting component positioned in said clamping gap.

19. A shielding device according to claim 18 wherein
said tensioning device comprises at least one nut on said first clamping leg, aligned screw holes in said clamping legs, and a tension bolt extending through said screw holes and engaging said nut.

* * * * *